United States Patent [19]

Yucebay

[11] Patent Number: 5,983,282

[45] Date of Patent: Nov. 9, 1999

[54] METHOD AND SYSTEM FOR COMPUTER NETWORK ACCESS USING COOPERATING NON-DEDICATED REMOTE ACCESS SERVERS

[75] Inventor: Mustafa S. Yucebay, Naperville, Ill.

[73] Assignee: 3Com Corporation, Santa Clara, Calif.

[21] Appl. No.: 09/038,435

[22] Filed: Mar. 11, 1998

[51] Int. Cl.[6] .................................................. G06F 13/00
[52] U.S. Cl. .......................................... 709/249; 709/225
[58] Field of Search .................................... 709/249, 225, 709/243, 220, 248

[56] References Cited

U.S. PATENT DOCUMENTS

| | | |
|---|---|---|
| 5,058,133 | 10/1991 | Duncanson et al. . |
| 5,231,649 | 7/1993 | Duncanson . |
| 5,256,863 | 10/1993 | Ferguson et al. ........................ 235/383 |
| 5,339,356 | 8/1994 | Ishii ......................................... 379/234 |
| 5,416,831 | 5/1995 | Chewning, III et al. ................. 379/96 |
| 5,528,595 | 6/1996 | Walsh et al. . |
| 5,530,741 | 6/1996 | Rubin ...................................... 379/142 |
| 5,577,105 | 11/1996 | Baum et al. . |
| 5,627,829 | 5/1997 | Gleeson et al. .......................... 370/230 |

Primary Examiner—Zarni Maung
Attorney, Agent, or Firm—McDonnell Boehnen Hulbert & Berghoff; Stephen Lesavich

[57] ABSTRACT

A method and system for computer access is provided. The method and system include an integrated remote access system comprising multiple cooperating non-dedicated remote access servers that provide access to a computer network such as the Internet, an intranet or other computer network for a switching office on a Public Switched Telephone Network ("PSTN"). The integrated remote access system is assigned a unique office code and other switching offices in the PSTN route access requests for the computer network to the integrated remote access system as though it were an actual switching office. No actual line numbers or ports are assigned by the PSTN for the integrated remote access system, increasing the number of available lines and ports on actual switching offices. The integrated remote access system eliminates the need for dedicated remote access servers to provide access to a computer network thereby decreasing costs for a network access server provider. The cooperating non-dedicated remote access servers that comprise the integrated remote access system are configured specifically to handle access requests and long duration connections to a computer network such as the Internet. Thus, capacity and performance are increased on the PSTN.

21 Claims, 6 Drawing Sheets

METHOD AND SYSTEM FOR COMPUTER NETWORK ACCESS USING COOPERATING NON-DEDICATED REMOTE ACCESS SERVERS

FIELD OF INVENTION

This invention relates to computer networks. More specifically, it relates to a method and system for accessing a computer network such as the Internet, an intranet or a local area network.

BACKGROUND OF THE INVENTION

A variety of computing devices are often accessed together to form a "computer network." The computer network may be a Local Area Network ("LAN") that access devices over a small geographical area, or a Wide Area Network ("WAN") that access devices over a large geographical area. A user with a computer and a telephony device such as a modem may establish a connection to a desired computer network (e.g., the Internet, an intranet, or another computer network) using a Public Switched Telephone Network ("PSTN"). The PSTN is any of those provided by AT&T, GTE, a Regional Bell Operating Company and others comprising multiple switching offices. Access to a desired computer network (e.g., the Internet) is provided by a network access service provider (e.g., America-On-Line, Netcom, etc.), which charge a user a fee to use dedicated access equipment to provide access to the desired computer network.

A user's access request for computer network access via a PSTN originates at a local end switching office, is sent to a central switching office, one or more intermediate switching offices and finally to a remote end switching office where dedicated access equipment for the desired computer network is accessed. The computer network typically has one or more dedicated Remote Access Servers ("RAS") that are connected to the end switching office to provide network access. The one or more dedicated RAS are connected to one or more trunks that provide an interface to the PSTN. The one or more dedicated RAS provide access to one computer network service provider (e.g., America-On-Line ("AOL"), Microsoft Network, Netcom, etc.) in a local service area. A dedicated RAS includes multiple telephony devices such as banks of modems, trunks and other telephony devices that provide connections to the one computer network from a PSTN.

An end office, and then a dedicated RAS receives incoming calls from the PSTN and forwards them to a computer network to provide network access. A dedicated RAS provides computer network access by receiving incoming calls from the PSTN via trunks. A dedicated RAS does not provide any telephonic switching capabilities, since this functionality is provided by the PSTN.

There are a number of problems associated with using a dedicated RAS connected to a PSTN to provide access to the Internet, an intranet and other computer networks. An access request from a user to a computer network passes through multiple switching offices, an end office, a RAS and a login server to provide access to a computer network such as the Internet or an intranet. There may be congestion at any of the multiple switching offices, the end office, the RAS and/or the login server. In addition, network paths between the switching offices, may be out-of-service and require additional routing, which in turn may cause additional congestion.

An end switching office connected to a dedicated RAS must provide enough capacity to handle its normal telephonic load as well as requests for the dedicated RAS. This includes allocating a certain number of resources including switching capacity, dial numbers, ports and trunk capacity in the switching office for the dedicated RAS. This limits the ability of the switching office to allocate additional dial numbers, ports, trunk and switching capacity to users and leaves dial numbers and ports allocated to the dedicated RAS unused or under used during certain periods.

Dial-up numbers used for a dedicated RAS access are assigned local dial-up numbers on a switching office connected to the dedicated RAS. The dial-up numbers for a computer network with a dedicated RAS cannot be recognized as direct intelligent network calls or direct wireless calls in a PSTN. This limits access to a computer network through a local dial-up number and makes it difficult for a mobile or wireless computer user to access a computer network outside of their home area.

In addition, a network access service provider must have one or more dedicated RAS connected to an end office in each local area that they provide network access service. For example, if a network service provider allowed customers in the 312, 414, and 608 area codes to access a computer network, an end office in the 312, 414, and 608 area codes would have one or more dedicated RAS to provide network access for users. This is very expensive for a network service provider, especially if the network service provider operates nationwide or world-wide as one or more dedicated RAS are required for at least one end office in multiple local areas.

SUMMARY OF THE INVENTION

In accordance with an illustrative embodiment of the present invention, the problems associated with using dedicated remote access servers to provide access to a computer network via a PSTN are overcome. A system and method for computer network access is provided. The system includes an integrated remote access system comprising multiple cooperating first network devices for providing access to multiple first computer networks. The multiple cooperating first network devices include multiple first connections for connecting the multiple cooperating first network devices to multiple second network devices on a second computer network. The first network devices handle requests for one or more of the multiple first networks for a second network device on the second computer network. A unique network identifier identifies the integrated remote access system to the multiple second network devices on the second network.

In an illustrative embodiment of the present invention, the multiple cooperating first network devices are non-dedicated remote access servers that provide access to one or more first computer networks like the Internet, an intranet, a LAN or other computer network. The multiple first connections connect the remote access servers to multiple end telephony switching offices in a public switched telephone network. The unique network identifier is a dial-up number for identifying the integrated remote access system to other telephony switching offices in a PSTN. The dial-up number includes a unique office code to identify an integrated remote access system, and a unique dial code to identify a computer network or a network service. However, the present invention is not limited to the networks, network devices, network connections, and network identifiers described and other network components may also be used.

The method includes providing a unique network identifier from a second computer network with multiple second network devices to an integrated remote access system including multiple cooperating first network devices. The integrated remote access system provides access to one or more first computer networks. The unique network identifier is received in an access request on the integrated remote access system from a second network device on the second computer network for access to a first computer network. A first network device is selected by the integrated remote access system from multiple cooperating first network devices comprising on the integrated remote access system. The selected first network device from the integrated remote access system provides access (e.g., to a login server) to the first computer network for the second network device.

In an illustrative embodiment of the present invention, a dial-up number for on an integrated remote access system is provided to multiple telephony switches by a public switched telephone network that includes a unique three-digit office code and a unique four-digit dial code. The integrated remote access system receives the dial-up number with the unique three digit office code from an end office telephony switch and selects a non-dedicated remote access server. The selected remote access server provides the end office telephony switch access (e.g., to a login server) to a computer network (e.g., the Internet, an intranet) or network service (e.g., voice or data services) based on the unique four-digit dial code from the dial-up number. However, the present invention, is not limited to the unique network identifier, and network devices described, and others may be used.

An illustrative embodiment of the present invention offers several advantages over the prior art. An illustrative embodiment of the present invention eliminates the need for multiple dedicated RAS for providing access to a computer network such as the Internet, an intranet or other computer network. This saves a computer network access service provider a significant amount of money as any RAS in an integrated remote access system can provide access to virtually any computer network. This integrated remote access system increases the switching capacity of an end telephony switching office and decreases congestion and overloads on an end switching office or on the PSTN. Once a unique network identifier is assigned to the integrated remote access system, the PSTN treats connection requests for the integrated remote access system like other connection requests for actual switching offices. The unique network identifier eliminates the need for dedicated lines and ports typically required for access to a computer network from an end switching office thereby, increasing the number of lines and ports available on an end office. The unique identifier also allows a flexible numbering system useable by new computer networks and computer network features. A global unique identifier can also be assigned for the integrated remote access system (e.g., a number similar to an 800, 888, or 900 number). The unique identifier can be used by wireless and mobile users to provide "local" access to a computer network outside a user's home area.

The foregoing and other features and advantages of an illustrative embodiment of the present invention will be more readily apparent from the following detailed description, which proceeds with references to the accompanying drawings.

DETAILED DESCRIPTION OF PREFERRED EMBODIMENTS

Figure 1:
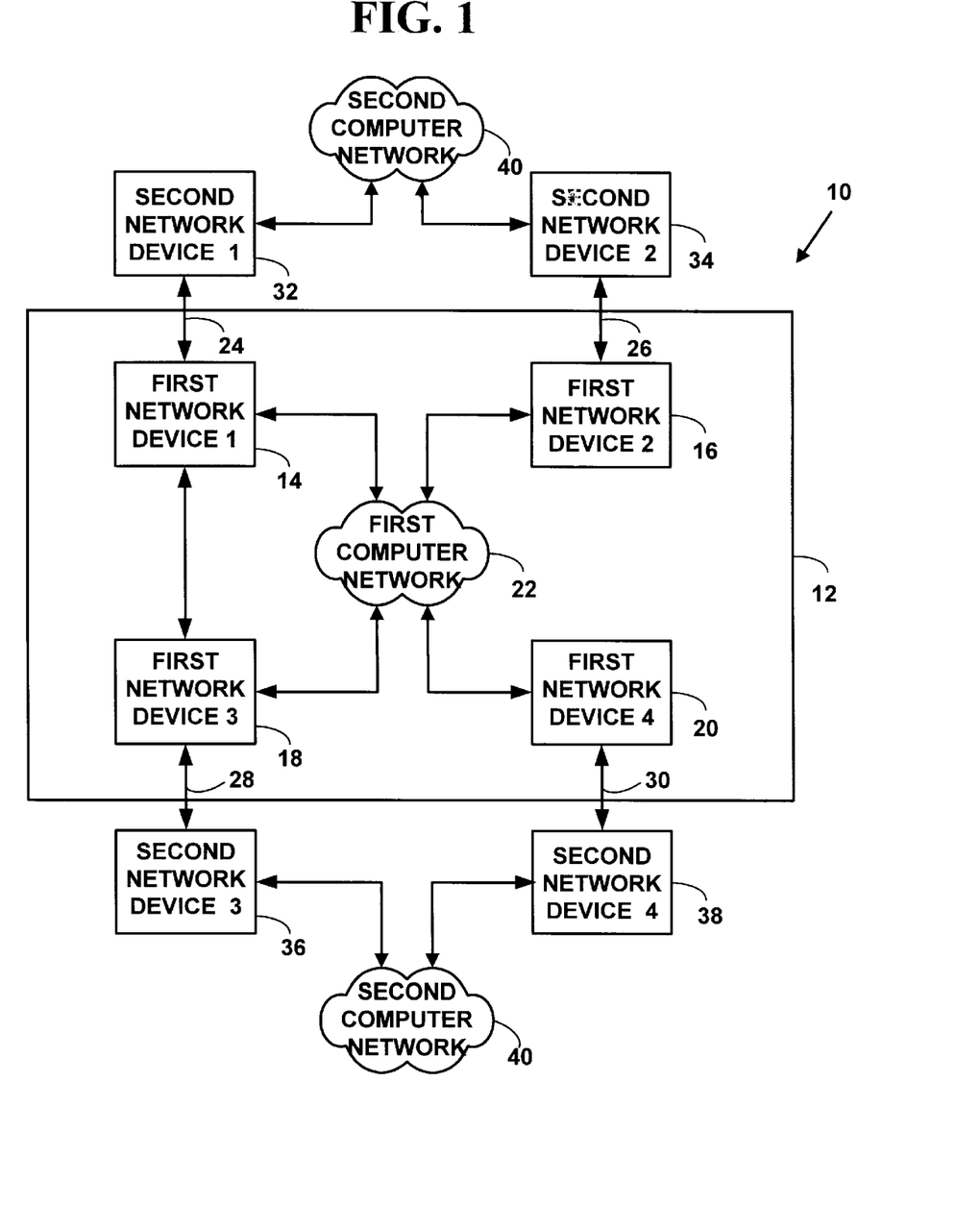
FIG. 1 is a block diagram illustrating a network access system.

FIG. 1 is a block diagram illustrating a network access system 10 for an illustrative embodiment of the present invention. Network access system 10 includes a network access device 12 with multiple cooperating first network devices (14, 16, 18, 20) connected to one or more first computer networks 22. The first network devices (14, 16, 18, 20) are non-dedicated network devices. Multiple connections (24, 26, 28, 30) of a first type connect network access device 12 to multiple second network devices (32, 34, 36, 38) that are connected to a second computer network 40. Selected first network devices may also be connected to other first network devices with optional connections as is illustrated by the connection between first network device 14 and first network device 18. Four first network devices, second network devices, and connections are illustrated in FIG. 1. However, the present invention is not limited to the four network devices or four connections and more or fewer network devices could also be used.

Network access device 12 has a unique identifier to allow multiple second network devices (32, 34, 36, 38) to send access requests for first computer network 22 to network access device 12. In one embodiment of the present invention, the unique network identifier is a dial-up number for network access device 12. However, other unique network identifiers could also be used. In an illustrative embodiment of the present invention, first network devices (14, 16, 18, 20) are remote access servers, first computer network 22 is the Internet, an intranet, a local area network or another computer network, second network devices (32, 34, 36, 38) are telephony switches and second computer network 40 is a public switched telephone network. However, the present invention is not limited to these network devices and computer networks, and other network devices and computer networks could also be used.

An operating environment for network access device 12 of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or (e.g., Random Access memory ("RAM")) non-volatile (e.g., Read Only Memory("ROM")) storage system readable by the CPU. The computer readable medium includes cooperating or interconnected computer readable media, which exist exclusively on the processing system or is distributed among multiple interconnected processing systems that may be local or remote to the processing system.

Network access device 12 includes a network access software module as a set of software instructions. The software instructions are executed as data bits by a CPU in a memory system. The network access software module allows network access device 12 to communicate with first network devices (14, 16, 18, 20), first computer network 22, second network devices (32, 34, 36, 38), and second computer network 40 with various networking protocols known in art.

Figure 2:
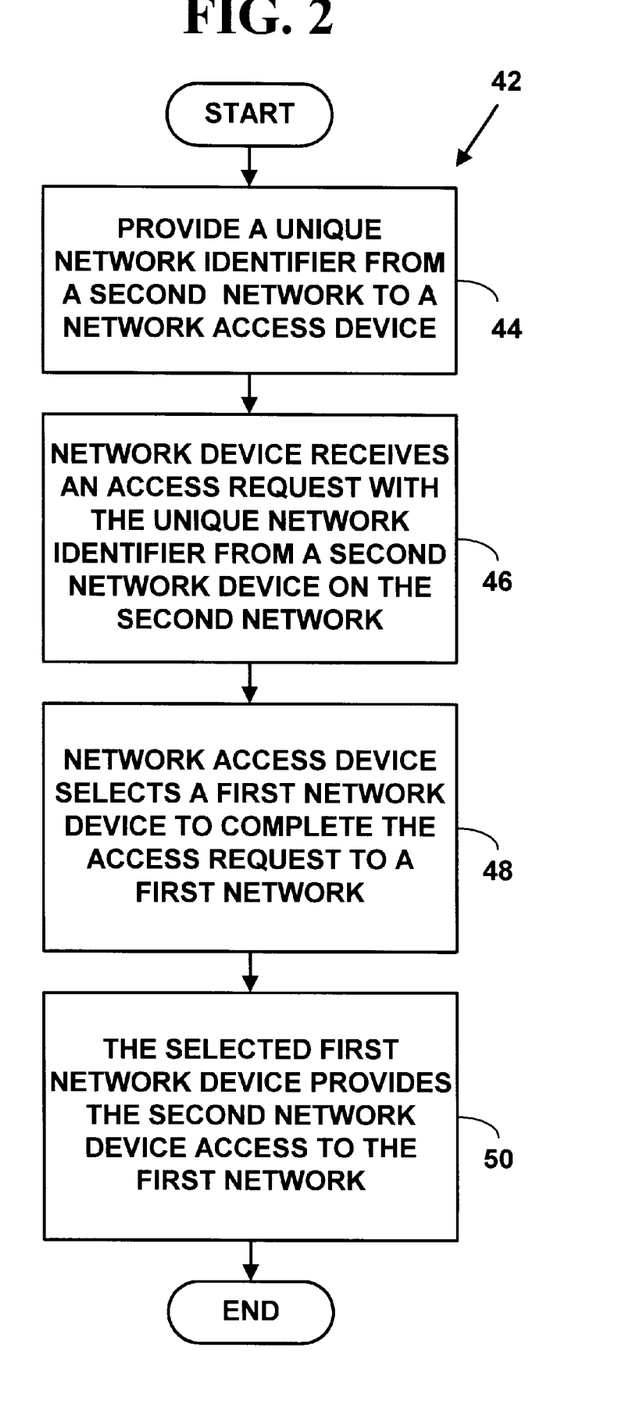
FIG. 2 is a flow diagram illustrating a method for accessing a computer network.

FIG. 2 is a flow diagram illustrating a method 42 for accessing a computer network. At step 44, the network access device is provided a unique network identifier by a second computer network. The unique network identifier allows a second network device on the second network to send access requests for a first computer network to the network access device. At step 46, the network access device receives an access request with the unique network identifier from a second network device on the second computer network. At step 48, the network access device selects a first network device from multiple cooperating first network devices comprising the network access device, which provide access to a first network. At step 50, the selected first network device provides the second network device access (e.g., to a login server) to the first computer network.

In a specific embodiment of the present invention, network access device is an "integrated remote access system," first network devices are remote access servers, first computer network is the Internet, an intranet, a local area network or another computer network, connections are high speed trunk connections, second network devices are telephony switching offices and second computer network is a public switched telephone network. However, other network components could also be used and the present invention is not limited to these network components.

As is known in the art, a Public Switched Telephone Network ("PSTN") provided by AT&T, GTE, a Regional Bell Operating company, and others includes a hierarchy of telephony switching offices. Individual subscribers are accessed on "local loops" or individual telephone lines to a nearby telephone exchange called an "end office" also called "end telephony office." One or more end offices may be accessed to a "local central office," also called a "local central telephony office" or accessed to a toll office." An end office may also function as a local central office (e.g., in a remote area or rural area).

Local central offices and/or end offices are accessed to "toll offices," or "toll telephony offices" by trunks. As is known in the telecommunication arts, a trunk is a circuit accessing two switching elements such as telecommunication exchanges including a local central office. Trunks are combined into trunk groups, creating a high capacity circuit capable of transmitting multiple channels of information between two telecommunication exchanges. Toll offices are accessed to a "primary telephony center" by trunks. Primary telephony centers are accessed to "sectional telephony centers" with very high capacity trunks. Sectional telephony centers are accessed to "regional telephony centers," which typically are the highest level in the PSTN switching hierarchy with very high capacity trunks.

The PSTN switching hierarchy uses a number plan consisting of hundreds of millions of dial-up numbers. A typical telephone number includes seven digits; a first set of three digits as an "office code" for identifying a switching office, and a second set of four digits as a "dial code" for identifying and individual subscriber's telephone line. A three digit code preceding the seven digit number is an "area code" used for long distance dialing. A long distance connection request (e.g., a telephone call) is first directed to a high-level toll office by an area code, then directed to an central office and/or an end office. A local connection request is dedicated to a local central office or an end office by the set of three digits, and then an individual subscriber's line by the last four digits as a dial code.

Figure 3:
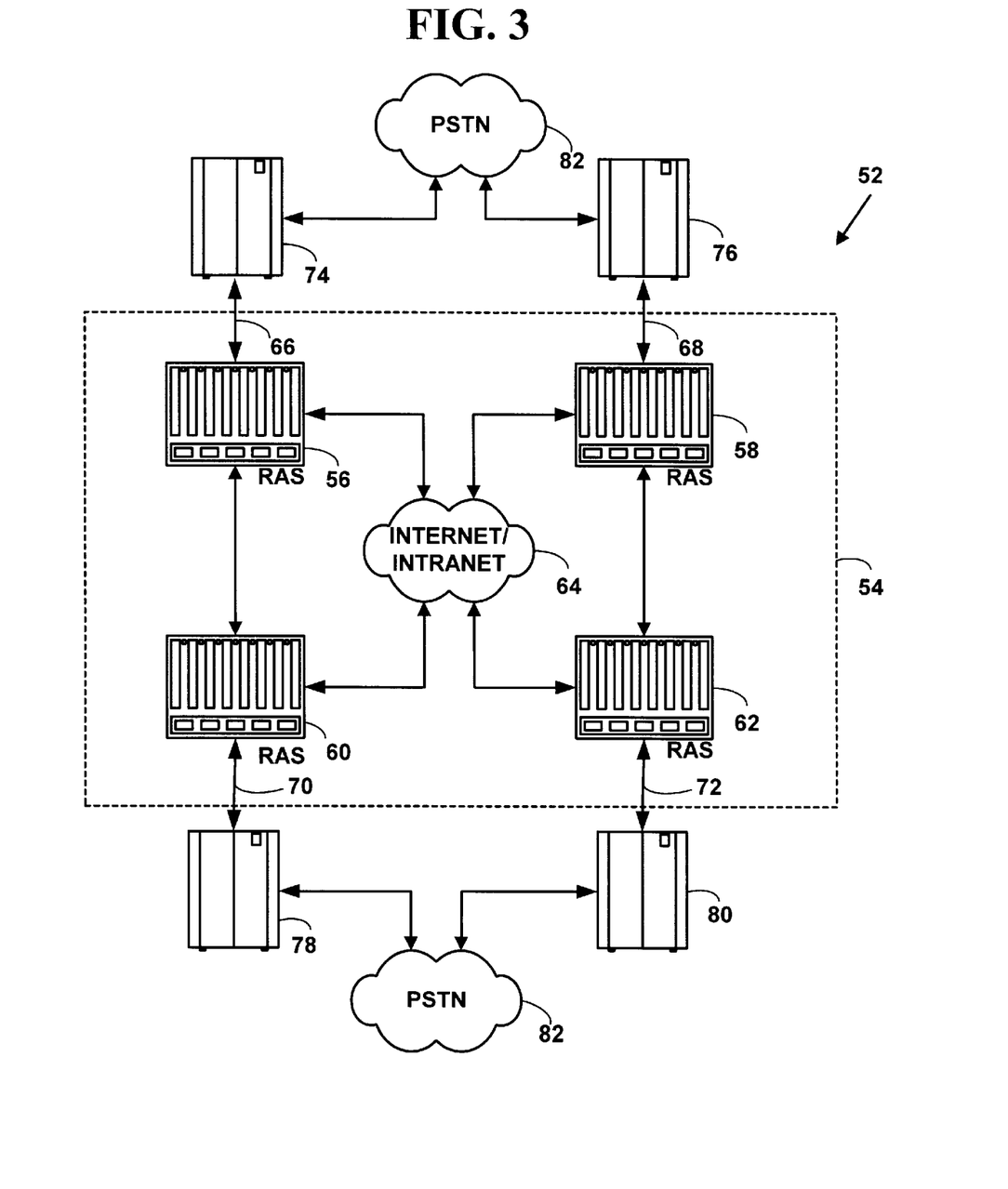
FIG. 3 is a block diagram illustrating a network access system.

FIG. 3 is a block diagram illustrating a network access system 52 for one embodiment of the present invention. Network access system 52 includes an integrated remote access system 54 illustrated by the dashed line in FIG. 3. Integrated remote access system 54 includes multiple cooperating Remote Access Servers ("RAS") (56, 58, 60, 62) providing connections to computer network 64 such as the Internet, an intranet, a local area network, or other computer network. RAS (56, 58, 60, 62) are non-dedicated RAS and provide connections to multiple network access service providers instead of a single network access service provider. An individual RAS may be connected to one or more other RAS. For example, FIG. 3 illustrates a connection between RAS 56 and RAS 60, and RAS 58 and RAS 62. However, other connection schemes may also be used. In addition, RAS (56, 58, 60, 62) may also be totally interconnected.

Integrated remote access system 54 also includes multiple connections (66, 68, 70, 72) providing high speed connections to multiple end offices (74, 76, 78, 80) in a PSTN 82. In one embodiment of the present invention, connections (66, 68, 70, 72) are trunk connections. Four RAS, end offices and connections are illustrated in FIG. 3. However, the present invention is not limited to four RAS, end offices or connections, and more or fewer may also be used.

RAS (56, 58, 60, 62) comprising integrated remote access system 54 are not required to be physically located near each other in integrated remote access system 54 and could be physically remote. In addition, RAS (56, 58, 60, 62) may be physically located in the same building as end offices (74, 76, 78, 80). RAS (56, 58, 60, 62) are not dedicated to provide access to any single computer network. In an illustrative embodiment of the present invention, integrated remote access system 54 does not have any terminating local loops, (i.e., terminating individual subscriber lines) and is accessed to PSTN 82 by multiple trunk connections (66, 68, 70, 72). In another embodiment of the present invention, integrated remote access system 54 has terminating local loops to provide direct access to computer network from individual users.

The multiple cooperating RAS (56, 58, 60, 62) of integrated remote access system 54 include a network access software module as a set of software instructions. The software instructions are executed by a CPU as data bits in a memory system. The network access software module allows the multiple RAS to cooperate and perform network access functions as integrated remote access system 54 as is indicated by the dashed line in FIG. 3 using networking protocols known in the art (e.g., Transmission Control Protocol ("TCP") over Internet Protocol (IP")). The network access software module allows a RAS to communicate with another RAS, computer network 64, end offices (74, 76, 78, 80) and PSTN 82.

Integrated remote access system 54 is assigned a unique network identifier so end offices (74, 76, 78, 80) can route access requests for computer network 64 to integrated remote access system 54. In an illustrative embodiment of the present invention, the unique network identifier is a seven digit dial-up number. A unique office code as a first set of three digits is selected to identify integrated remote access system 54 (e.g., 725). In an illustrative embodiment of the present invention, the dial code (i.e., the last four digits) are not used to identify integrated remote access system 54, only the unique three-digit office code is used. A second set of four digits as a dial code can be any number from 0000 to 9999 since integrated remote access system 54 does not have any terminating local loops (i.e., individual lines ) and is not required to provide actual local loop lines or ports to terminate such a number. In an illustrative embodiment of the present invention integrated remote access system 54 is connected to multiple and switching offices (76, 76, 78, 80) by trunks so virtually any office code and dial code can be used without affecting line/port resources of an end office. Thus, the dial-up capacity of integrated remote access system 54 is not limited due to line or port capacity, but is instead limited by the number of non-dedicated RAS in integrated remote access system 54. If more than 10,000 dial codes are required, then a second unique office code can be assigned to integrated remote access system. As is known in the art, an end office typically has multiple office codes (e.g., 721, 722, 723, 724 and 725) to service a number of individual subscribers in the same geographical area. A global office code (e.g., 999) could also be used for to identify an integrated remote access system 54 to users outside a local calling area (e.g., a global number similar to an 800, 888, or 900 number).

The last four digits as a dial code of a dial-up number can also be used to identify an individual network service provider or network access service, or be used for routing for multiple network service providers that may be served by integrated remote access system 54. The dial code is also used to allow a first integrated remote access system 54 to route a request to a second integrated remote access system 54 if the last four digits as a dial code are unknown to the first integrated remote access system 54. In an illustrative embodiment of the present invention, routing is handled by RAS (56, 58, 60, 62) in integrated remote access system 54. In another embodiment of the present invention, a proxy server or other hardware or software device (not illustrated in FIG. 3) is used for routing based on the dial code of the dial-up number. A single seven digit dial-up number can be assigned to a network service provider, and the same seven digit dial-up number can be used from anywhere in PSTN 82 to access an integrated remote access system that provides access to the network service provider. Table 1 illustrates using an exemplary set of dial codes along with a unique office code to provide access to a computer network from integrated remote access system 54. However, other office codes and dial code numbers could also be used.

TABLE 1

| Three digit office code to identify integrated remote access system 54 | Four digit dial code to identify a network access provider or network service | Network |
|---|---|---|
| 725 | 0001 | America-On-Line |
| 725 | 0002 | AT&T World Net |
| 725 | 0003 | Microsoft Network |
| ... | ... | ... |
| 725 | 0010 | Unknown network service provider-1 |
| 725 | 0011 | Unknown network service provider-2 |
| 725 | 0012 | Unknown network voice provider (routed to another integrated remote access system) |
| 725 | 0013 | Network voice provider-1 |
| 725 | 0014 | Network voice provider-2 |
| ... | ... | ... |

In an illustrative embodiment of the present invention, integrated remote access system 54 first allocates access requests to RAS (56, 58, 60, 62) based on an end office (74, 76, 78, 80) originating a access request. For example, if end office 74 initiated an access request, then integrated remote access system 54 would assign RAS 56 to handle the access request since RAS 56 is connected to end office 74 with connection 76. Integrated remote access system 54 may also allocate an access request to another RAS based on other factors such as a busy status, access request holding time, or other factors.

PSTN 82 treats access requests for an office code for integrated remote access system 54 just like any other actual central office or end office. PSTN 82 routes an access request for integrated remote access system 54 to a local central office, which in turn routes it to a local end office. If a selected end office does not have direct connection to integrated remote access system 54, the selected end office routes the access request to another end office (74, 76, 78, 80) directly connected to integrated remote access system 54 with a trunk.

If a selected end office's connections to integrated remote access system 54 are all busy, the selected end office routes the access request to another less busy end office connected to integrated remote access system 54. For example, if end office 74 has an access request for computer network 64 but its connection 66 to RAS 56 was busy, then end office 74 may route the access request to end office 76 with connection 68 to RAS 58 in integrated remote access system 54, which has available bandwidth on connection 68.

To access computer network 64, a user dials a seven digit number (e.g., 725-0001) for integrated remote access system 54, which is just like any other seven digit telephone number. PSTN 82 routes the access request to an end office connected to integrated remote access system 54 based on a three digit office code (e.g., 725). Integrated remote access system routes the access request to an individual network access provider or network service based on the dial code (e.g., 0001).

Figure 4:
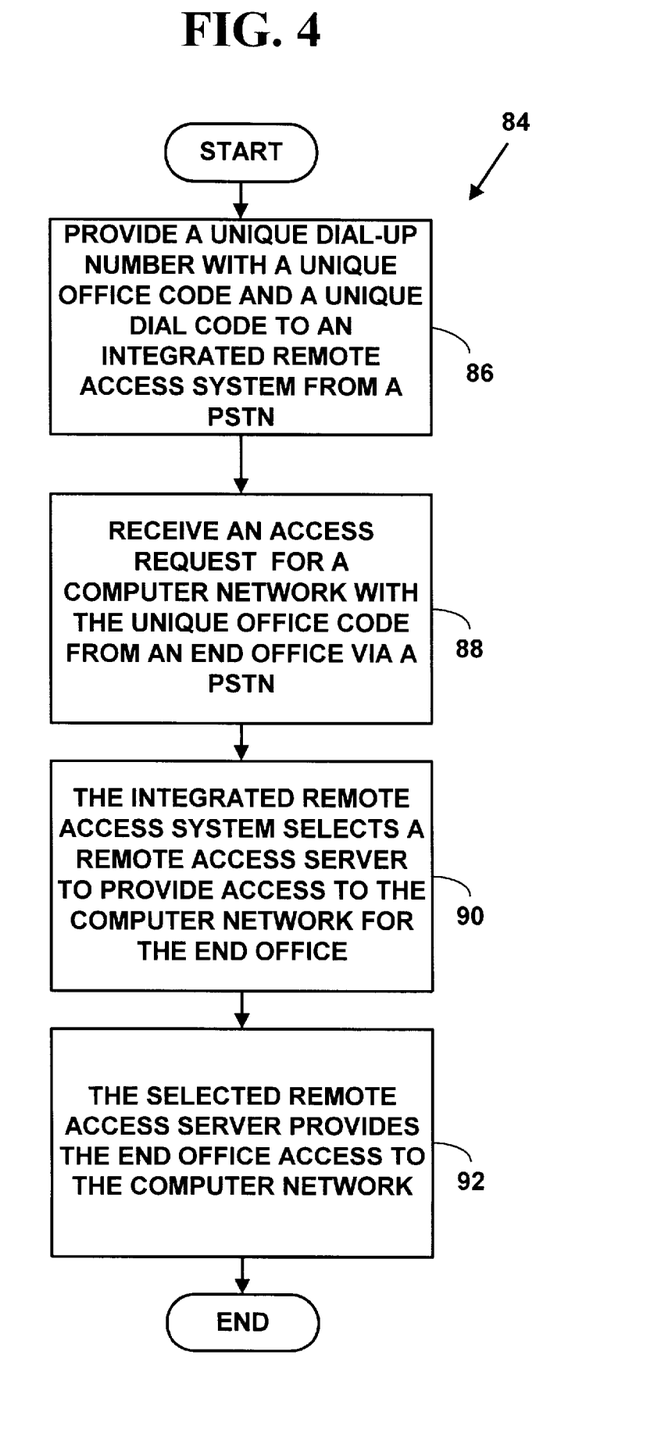
FIG. 4 is a flow diagram illustrating a method for accessing a computer network.

FIG. 4 is a flow diagram illustrating a method 84 for accessing a computer network. At step 86, integrated remote access system 54 is provided seven digit dial-up number with a unique three digit office code and a unique four digit dial code by PSTN 82. Switching offices in PSTN 82 route any access requests to integrated remote access system 54 using the unique three digit office code. At step 88, integrated remote access system 54 receives an access request for computer network 64 from an end office (e.g., 74) via PSTN 82. Integrated remote access system 54 selects a RAS (e.g., 56) at step 90. In an illustrative embodiment of the present invention, selection of a RAS depends on which end office requested the access request. The selected RAS typically has a connection to the end office that requested the access request. However, since RAS are non-dedicated, a RAS can also be selected based on other factors such as current traffic on a RAS or the current number of connections to computer network 64. At step 92, the selected RAS provides the end office access to the computer network (e.g., RAS 56 access end office 74 to computer network 64) using the dial code.

Figure 5:
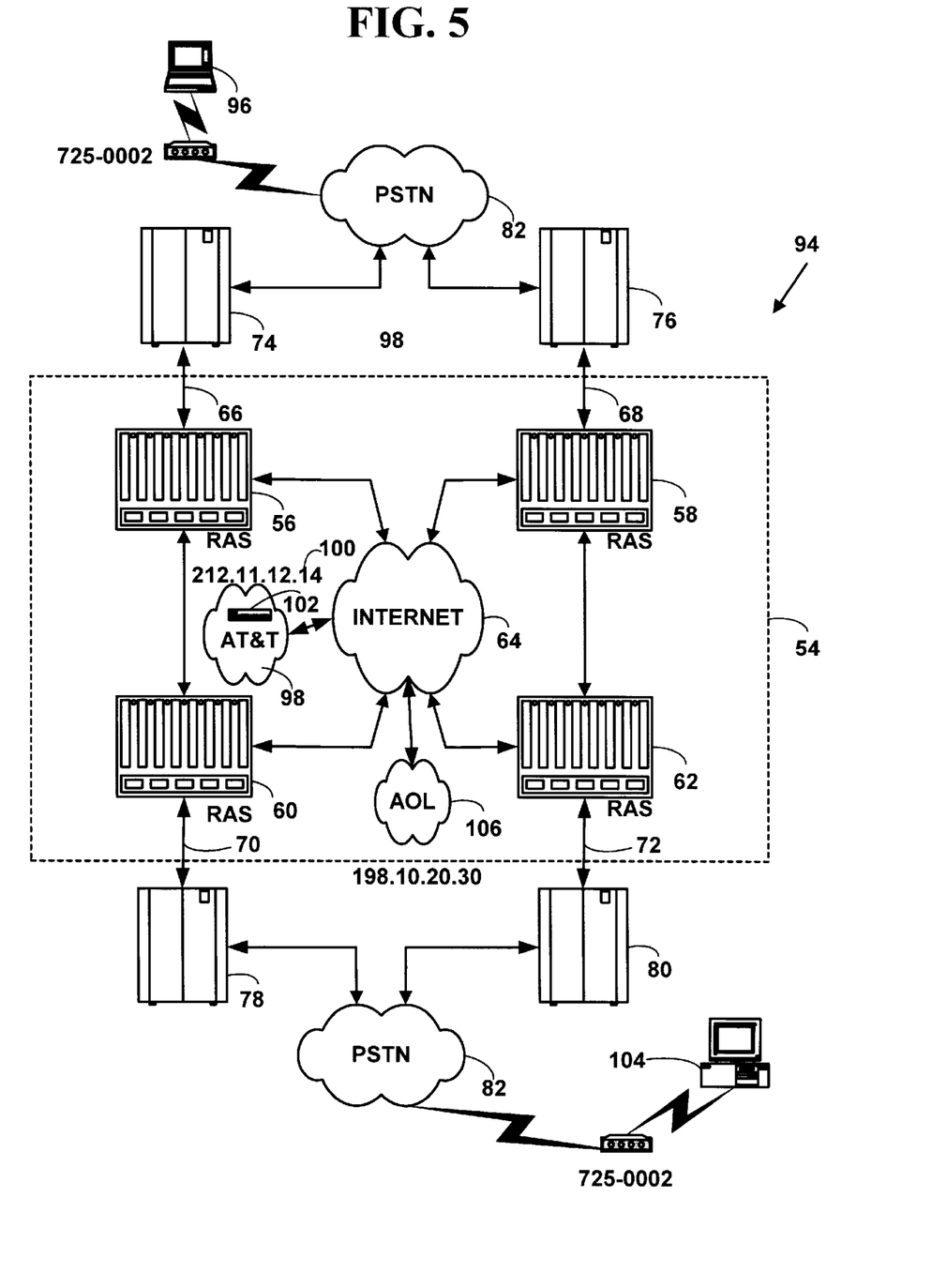
FIG. 5 is a block diagram illustrating a network access system.

Table 2 illustrates a network access table used by non-dedicated RAS (56, 58, 60, 62) to provide an end office access to a computer network such as the Internet or an intranet. However, other network access table layouts could also be used and the present invention is not limited to the network access table shown in Table 2.

responsible for network access. For example, RAS 56 provides end office 74 access to the Internet 64 using network address 100 (e.g., 212.11.12.14) for login server 102 for AT&T World Net 98. Since RAS (56, 58, 60, 62) are non-dedicated, AT&T World Net 98 does not have to provide a dedicated RAS in integrated remote access system 54 or PSTN 82. RAS 56 can also be be used to connect user 96 to AOL 106 if first user dialed 725-0001 (Table 1). If user 104 also dialed 725-0002, integrated remote access system 54 will also allow user 104 to access AT&T World Net 98. However, user 104 accesses AT&T Word Net 98 with end office 80, another RAS 62 and another connection 72. Integrated remote access system 54 provides access to a computer network without RAS dedicated to any individual network access service provider (e.g., AT&T or AOL).

In one specific embodiment of the present invention, integrated remote access system 54 includes RAS (56, 58, 60, 62) implemented as a "Total Control Telephony Chassis" by the U.S. Robotics Division, of 3Com Corporation of Santa Clara, Calif. The Total Control Telephony Chassis includes multiple network interface cards accessed by a common bus with one or more software modules to provide network connections. The network interface cards include modems, T1 cards, DS1 cards, ISDN cards, Asymmetric Digital Subscriber line cards, and other network interface cards. See "Modem Input/Output Signal Processing Techniques,"U.S. Pat. No. 5,528,595, granted to Dale M. Walsh et al., incorporated herein by reference, for more information. Connections (66, 68, 70, 72) access end offices (74, 76, 78, 80) to a 3Com/U.S. Robotics T1 or DS1 card in RAS (56, 58, 60 62) over a high speed trunk. However, other

TABLE 2

| Four digit dial code to identify a network access provider | Login Server Internet IP address | Network |
|---|---|---|
| 0001 | 198.10.20.30 | America-On-Line ("AOL") |
| 0002 | 212.11.12.14 | AT&T World Net |
| 0003 | 150.16.14.13 | Microsoft Network |
| ... | ... | ... |
| 0010 | 199.10.20.30 | Unknown network service provider-1 |
| 0011 | 199.10.20.40 | Unknown network service provider-2 |
| 0012 | 199.20.10.10 | Unknown network voice provider (routed to another integrated remote access system) |
| 0013 | 199.20.10.20 | Network voice provider-1 |
| 0014 | 199.20.10.20 | Network voice provider-2 |
| ... | ... | ... |

FIG. 5 is a block diagram illustrating a network access system 94. For example, if a user 96 desires to access to Internet 64 via AT&T World Net, an Internet service provider, user 96 would dial 725-0002 (Table 1). PSTN 82 would route the request from user 96 to an end office (e.g., 74) and then to integrated remote access system 54 over a connection (e.g., 66) using the 725 office code. The office code of "725" (Table 1) allows PSTN 82 to route the request to integrated remote access system 54. Integrated remote access system selects a RAS (e.g., 56) to provide access to Internet 64 with network access service provider AT&T World Net 98. RAS 56 uses information in a network access table such as the network access table illustrated in Table 2 to provide access to AT&T World Net 98. The dial code of "0002" is used by RAS 56 to determine a network address 100 (e.g., 212.11.12.14) for the desired network service provider 98 (Table 2).

Access to a computer network is provided by connecting end office 74 to a login server 102 or other network device connection cards could also be used in RAS (56, 58, 60, 62) (e.g., T3, DS1, DS3 or ISDN cards).

An illustrative embodiment of the present invention can also be used for providing voice-over-Internet Protocol capabilities and other voice access services (e.g., standard telephone voice, Integrated Services Digital Network voice or Asymmetric Digital Subscriber Line voice). As is known in the art, the Internet Protocol ("IP") is a routing protocol designed to route traffic within a network or between networks. Voice-over-IP is a method for providing voice capabilities over an IP network such as the Internet or an intranet. Integrated remote access system 54 provides voice connection access capabilities as well data connection access capabilities.

Figure 6:
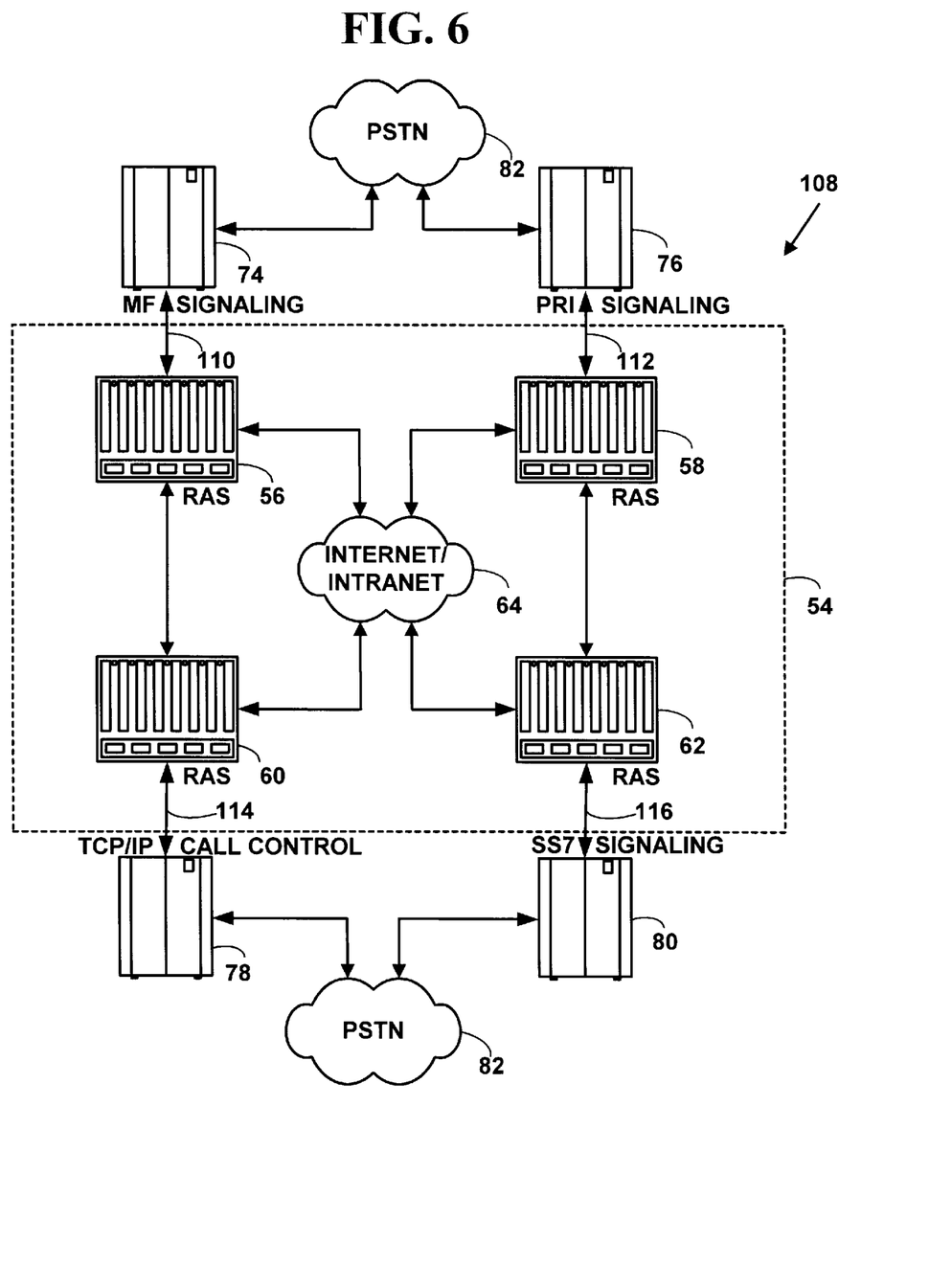
FIG. 6 is a block diagram illustrating signaling for a network access system.

FIG. 6 is a block diagram illustrating signaling for a network access system 108. Integrated remote access system 54 can use a number of different signaling methods over connections (66, 68, 70, 72) depending on the type of end office connections being used in PSTN 82. The signaling methods include System Signaling 7 ("SS7") including Integrated Services User Part ("ISUP") and Telephone User Part ("TUP"), Multi-Frequency ("MF") signaling, Integrated Services Digital Network ("ISDN") signaling for the Primary Rate Interface ("PRI"), Non-Facility Associated Signaling ("NFAS"), NFAS/PRI signaling, Transmission Control Protocol ("TCP") over Internet Protocol ("IP") call control ("TCP/IP call control") and other signaling methods known in the telecommunications arts. MF signaling, PRI signaling, TCP/IP call control signaling and SS7 signaling are illustrated with connections 110, 112, 114, and 116 respectively in FIG. 6. A local central office or end office uses these signaling methods over trinks to route incoming calls (i.e., outgoing calls for the end office) to integrated remote access system 54 based on the office code for integrated remote access system 54 and optionally a dial code. Integrated remote access system 54 can also use the same signaling method on all connections, or multiple signaling methods on the same connection using individual connection types as part of a connection.

ISDN PRI and NFAS PRI signaling are often used for PBX interfaces by central offices. The routing of calls to trunks with this type of signaling is done by the last four digits in a dial-up number instead of the first three digits used as an office code. However, integrated remote access system 54 is still located with the unique office code. In addition, wireless signaling including Interworking Functionality ("IWF") can also be used over connections (110, 112, 114, 116). If wireless signaling is used, end offices (74, 76, 78, 80) include wireless switching offices, satellite offices or other wireless connection offices.

Outside of North America, integrated remote access system 54 may be assigned a unique office code and a dial code that is one to four digits depending on the numbering plan used in an individual country. In addition, connections (110, 112, 114, 116) would use international signaling protocols such as R2, Multi-Frequency Compelled ("MFC"), and other international signaling protocols known in the telecommunications arts. In international signaling applications, trunk connections such as those using a T1 are replaced with an E1 connection. As is known in the telecommunication arts, an E1 has a bit rate of 2.048 Mega-bit-per-second ("Mbps") with 32 time slots of 8-bits each sampled every 125 microseconds (i.e., 32×8-bits/125×10$^{-6}$ seconds=2.048 Mbps) while a T1 card has 24 time slots and a data rate of 1.544 Mbps.

In an illustrative embodiment of the present invention, integrated remote access system 54 handles only incoming calls and will provide only access connections to computer network 64. In another embodiment of the present invention, integrated remote access system 54 also provides outgoing calls and billing for access connections to other computer networks.

In another embodiment of the present invention, integrated remote access system 54 uses various forms of virtual tunneling and reverse virtual tunneling to virtually source access requests from one RAS to another RAS and to other network devices to computer network 64. For more information on virtual tunneling see Level 2 Tunneling Protocol ("L2TP") or Point-to-Point Tunneling Protocol ("PPTP") in Internet Engineering Task Force ("IETF") draft documents by Kory Hamzeh, et. al incorporated herein by reference (IETF draft documents are precursors to IETF Request For Comments ("RFCs") and are works in progress).

An illustrative embodiment of the present invention offers several advantages over the prior art. An illustrative embodiment of the present invention eliminates the need for multiple dedicated RAS for providing access to a computer network such as the Internet, an intranet or another computer network. This saves a computer network access service provider a significant amount of money as any RAS in an integrated remote access system can provide an access connection to virtually any computer network. This integrated remote access system increases the switching capacity of an end telephony switching office and decreases congestion and overloads on an end switching office or on the PSTN. Once a unique network identifier is assigned to the integrated remote access system, the PSTN treats connection requests for the integrated remote access system like other connection requests for actual switching offices. The unique network identifier eliminates the need for dedicated lines and ports typically required for access to a computer network from an end switching office thereby, increasing the number of times and ports available on an end office. The unique identifier also allows a flexible numbering system useable by new computer networks and network access features. A global unique identifier can also be assigned for the integrated remote access system (e.g., a number similar to an 800, 888, or 900 number). The unique identifier can be used by wireless and mobile users to provide "local" access to a computer network outside a user's home area. Thus, an integrated remote access system provides improved and cost effective access to a computer network like the Internet or an intranet.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A network access system for providing access to a computer network, the network access system comprising:

a plurality of cooperating non-dedicated remote access servers comprising an integrated remote access system, for providing access to a plurality of first computer networks for a plurality of second network devices on a second computer network, wherein any of the plurality of cooperating non-dedicated remote access servers can provide network access to a first computer network for any of the plurality of second network devices;

a plurality of separate connections, for connecting the plurality of non-dedicated remote access servers comprising the integrated remote access system to each other and for connecting the plurality of non-dedicated remote access servers to the plurality of second network devices on the second computer network; and one or more unique network identifiers, for identifying the integrated remote access system to the plurality of second network devices on the second network, wherein the one or more unique network identifiers are assigned without allocating any network resources on the plurality of second network devices on the second network.

2. The network access system of claim 1 wherein the one or more unique network identifiers are assigned without allocating any line or port resources on the plurality of second network devices on the second network.

3. The network access system of claim 1 wherein the first computer network is any of the Internet, or an intranet.

4. The network access system of claim 1 wherein the plurality of second network devices include a plurality of telephony switches and the second computer network is a public switched telephone network.

5. The network access system of claim 1 wherein the plurality of cooperating non-dedicated remote access servers include a network access software module that allows the plurality of non-dedicated remote access servers to cooperate and perform network access functions as an integrated remote access system.

6. The network access system of claim 1 wherein the plurality of separate connections totally interconnect the plurality of cooperating non-dedicated remote access servers.

7. The network access system of claim 1 wherein the plurality of separate connections use a plurality of signaling methods including any of Signaling System-7 signaling, multi-frequency signaling, Integrated Services Digital Network signaling, Transmission Control Protocol over Internet Protocol call control, wireless signaling, satellite signaling, virtual tunneling, R2 signaling, or multi-frequency compelled signaling.

8. The network access system of claim 1 wherein a unique identifier is a dial-up number from the second computer network for the network access system, and wherein the dial-up number is assigned without allocating any line or port resources on the plurality of second network devices on the second network.

9. The network access system of claim 8 wherein the dial-up number includes a unique office code to identify the network access system and a unique dial code to identify any of a network access service provider or a network access service, and wherein the unique office code and unique dial code are assigned without allocating any line or port resources on the plurality of second network devices on the second network.

10. The network access system of claim 9 wherein the unique dial code identifies an Internet Protocol address for a login server on a first computer network.

11. A method of accessing a computer network with an integrated remote access system, the method comprising the following steps:

providing a unique network identifier to an integrated remote access system from a second computer network, the integrated remote access system having a plurality of cooperating non-dedicated remote access servers, wherein the unique network identifier is assigned to the integrated remote access system without allocating any network resources on on the second computer network;

receiving the unique network identifier in an access request on a first remote access server in the integrated remote access system from a second network device on the second computer network to connect the second network device to a first computer network;

selecting a second non-dedicated remote access server on the integrated remote access system from the plurality of cooperating non-dedicated remote access servers based on predetermined selection criteria; and providing the second network device access to the first computer network using the selected second non-dedicated remote access server.

12. A computer readable medium having stored therein instructions for causing a central processing unit to execute the method of claim 11.

13. The method of claim 11 wherein the the first non-dedicated remote access server and the second non-dedicated remote access server are different non-dedicated remote access servers.

14. The method of claim 11 wherein the first non-dedicated remote access server and the second non-dedicated remote access server are the same non-dedicated remote access server.

15. The method of claim 11 wherein the first computer network is any of the Internet or an intranet.

16. The method of claim 11 wherein the second computer network is a public switched telephone network and the plurality of second network devices include a plurality of telephony switching offices.

17. The method of claim 11 wherein the unique network identifier is a dial-up number for the integrated remote access system on the second computer network, and wherein the dial-up number is assigned without allocating any line or port resources on the second network.

18. The method of claim 11 wherein the unique network identifier includes a unique office code to identify the integrated network access system and a unique dial code to identify any of a network access service provider or a network access service, and wherein unique office code and unique dial code are assigned without allocating any line or port resources on the second network.

19. The method of claim 11 wherein the step of providing the second network device access to the first computer network includes providing the second network device access to a login server on the first computer network.

20. The method of claim 11 wherein the step of providing the second network device access to the first computer network includes providing access to any of a voice connection access server or a data connection access server using the selected second non-dedicated remote access server.

21. The method of claim 20 wherein the voice connection server is a Voice-over-Internet Protocol connection server.

* * * * *